US012454594B2

(12) United States Patent
Testud et al.

(10) Patent No.: US 12,454,594 B2
(45) Date of Patent: Oct. 28, 2025

(54) BLOCK COPOLYMER WITH IMPROVED RESISTANCE TO SEBUM

(71) Applicant: Arkema France, Colombes (FR)

(72) Inventors: Blandine Testud, Serquigny (FR); Quentin Pineau, Serquigny (FR)

(73) Assignee: ARKEMA FRANCE, Puteaux (FR)

( * ) Notice: Subject to any disclaimer, the term of this patent is extended or adjusted under 35 U.S.C. 154(b) by 794 days.

(21) Appl. No.: 17/614,835

(22) PCT Filed: May 27, 2020

(86) PCT No.: PCT/FR2020/050888
§ 371 (c)(1),
(2) Date: Nov. 29, 2021

(87) PCT Pub. No.: WO2020/240132
PCT Pub. Date: Dec. 3, 2020

(65) Prior Publication Data
US 2022/0242994 A1 Aug. 4, 2022

(30) Foreign Application Priority Data
May 29, 2019 (FR) ...................... 1905746

(51) Int. Cl.
C08F 293/00 (2006.01)
C08L 77/12 (2006.01)

(52) U.S. Cl.
CPC ............ C08F 293/00 (2013.01); C08L 77/12 (2013.01)

(58) Field of Classification Search
CPC ........ C08G 63/08; C08G 69/44; C08F 293/00
See application file for complete search history.

(56) References Cited

U.S. PATENT DOCUMENTS

| 471,203 | A | | 3/1892 | Walker |
| 3,021,309 | A | | 2/1962 | Cox et al. |
| 3,021,317 | A | | 2/1962 | Cox et al. |
| 4,115,475 | A | | 9/1978 | Foy et al. |
| 4,195,015 | A | | 3/1980 | Deleens et al. |
| 4,230,838 | A | | 10/1980 | Foy et al. |
| 4,331,786 | A | | 5/1982 | Foy et al. |
| 4,332,920 | A | | 6/1982 | Foy et al. |
| 4,663,413 | A | | 5/1987 | Ward |
| 4,663,428 | A | * | 5/1987 | Okitu ..................... C08G 69/44 528/324 |
| 4,839,441 | A | | 6/1989 | Cuzin et al. |
| 4,864,014 | A | | 9/1989 | Cuzin et al. |
| 5,204,055 | A | * | 4/1993 | Sachs ..................... B33Y 40/00 264/432 |
| 5,446,109 | A | * | 8/1995 | Matsumura ............. C08L 67/02 525/425 |
| 5,932,686 | A | * | 8/1999 | Hoff ....................... C08G 69/44 525/425 |
| 6,552,131 | B1 | | 4/2003 | Higuchi et al. |
| 8,231,950 | B2 | | 7/2012 | Malet et al. |
| 9,914,804 | B2 | | 3/2018 | Malet et al. |
| 2003/0027927 | A1 | * | 2/2003 | White ..................... C08G 69/44 525/88 |
| 2004/0236059 | A1 | | 11/2004 | Piqueras et al. |
| 2006/0018942 | A1 | * | 1/2006 | Rowe ...................... A61L 27/54 424/422 |
| 2010/0210745 | A1 | * | 8/2010 | McDaniel ................ C09D 7/48 521/55 |
| 2011/0110995 | A1 | * | 5/2011 | Hasegawa .............. A61Q 17/04 424/59 |
| 2012/0238701 | A1 | | 9/2012 | Yamada et al. |
| 2016/0229946 | A1 | | 8/2016 | Smits et al. |
| 2019/0201317 | A1 | * | 7/2019 | Konishi ................. A61Q 17/04 |

FOREIGN PATENT DOCUMENTS

| CN | 101514242 A | 8/2009 |
| DE | 2546534 A1 | 4/1977 |
| EP | 0504058 A1 | 9/1992 |
| EP | 0506495 A2 | 9/1992 |
| EP | 0613919 A1 | 9/1994 |
| EP | 1057870 A1 | 12/2000 |
| EP | 1155065 A1 | 11/2001 |
| EP | 1236512 A1 | 9/2002 |
| EP | 1262527 A2 | 12/2002 |
| EP | 1270211 A1 | 1/2003 |
| EP | 1457514 A1 | 9/2004 |
| EP | 2500370 A1 | 9/2012 |
| FR | 950637 A | 10/1949 |

(Continued)

OTHER PUBLICATIONS

Gube et al. Polymer International 2012, 61, 157-162 (Year: 2012).*
Office Action (the First Office Action) issued on Dec. 5, 2022, by the China National Intellectual Property Administration in corresponding Chinese Patent Application No. 202080049862.7, English Translation only. (9 pages).
Li, J. "Plastic Industry Handbook—Polyurethanes", Chemical Industry Press, p. 407, Jul. 31, 1999, 8 pages. With English translation.
International Search Report (PCT/ISA/210) with translation and Written Opinion (PCT/ISA/237) mailed on Aug. 7, 2020, by the European Patent Office as the International Searching Authority for International Application No. PCT/FR2020/050888. (13 pages).
Office Action issued on Jul. 2, 2024, by the Japanese Patent Office (JPO) in corresponding Japanese Patent Application No. 2021-570404, 9 pages.

(Continued)

Primary Examiner — Mark S Kaucher
(74) Attorney, Agent, or Firm — Boone IP Law

(57) ABSTRACT

The present invention concerns the use of PCL in preparing a block copolymer comprising at least one rigid block and at least one flexible block, for enhancing the sebum resistance of said block copolymer.
The present invention also provides a sebum-resistant block copolymer, characterized in that it comprises rigid blocks and flexible blocks comprising at least 50% by weight of PCL, based on the total weight of flexible blocks, which represents 100%; a process for synthesizing said copolymer; and also compositions and articles comprising a sebum-resistant copolymer of this kind.

15 Claims, No Drawings

(56) References Cited

FOREIGN PATENT DOCUMENTS

| | | |
|---|---|---|
| FR | 2936803 A1 | 4/2010 |
| FR | 2941700 A1 | 8/2010 |
| JP | H0362804 A | 3/1991 |
| JP | H05239175 A | 9/1993 |
| JP | H07173282 A | 7/1995 |
| JP | H08245786 A | 9/1996 |
| JP | H109225 A | 1/1998 |
| JP | 2006316219 A | 5/2005 |
| JP | 2008106415 A | 5/2008 |
| WO | 9222600 A1 | 12/1992 |
| WO | 9512629 A1 | 5/1995 |
| WO | 2004037898 A1 | 5/2004 |
| WO | 2013180008 A1 | 12/2013 |

OTHER PUBLICATIONS

3rd Party Observation issued on May 8, 2024, n corresponding Japanese Patent Application No. 2021-570404, 22 pages.
European Official Action issued by the European Patent Office in corresponding European Application No. 20743186.7, mailed on Mar. 24, 2025, 14 Pages.

* cited by examiner

BLOCK COPOLYMER WITH IMPROVED RESISTANCE TO SEBUM

FIELD OF THE INVENTION

The invention relates to thermoplastic polymer elastomers (TPE), block copolymers, in particular with rigid polyamide blocks and with flexible blocks, which exhibit improved sebum resistance.

They are of interest in any equipment that may be in contact with the skin, for a greater or lesser duration or repeatedly.

TECHNICAL BACKGROUND

Thermoplastic elastomers constitute a class of materials exhibiting a unique combination of properties. These materials can be formulated so as to be both flexible and strong, while having elastic characteristics. With particular advantage these materials can also be processed in the melt by virtue of their thermoplastic nature. Moreover, unlike their crosslinked rubber counterparts, thermoplastic elastomers can be recycled and reprocessed.

Thermoplastic elastomers are used in numerous applications. TPE materials may for example be molded, and may also be overmolded, allowing a further layer to be formed on an existing molding. By virtue of their flexible and elastic nature, thermoplastic elastomers are commonly used in applications where the material undergoes constant or repeated deformation or is in contact with other moving parts.

Sebum resistance is an important property of a thermoplastic elastomer composition used to make articles that are in permanent or repeated contact with the human body, such as handles, buttons or else protective elements for articles—electronics, IT and/or telephony articles, for example. Repeated contact with sebum may cause certain elastomers to stain or discolor, but also to lose mechanical properties, and even to deform or swell. The human skin secretes sebum, which is known to attack polymer chains and reduce their molecular weight.

Moreover, artificial sebum may be applied to the skin. It is composed of natural and artificial chemicals such as saturated and unsaturated fatty acids, examples being oleic, stearic and palmitic acids.

A thermoplastic elastomer composition is found still to be liable to degrade when in repeated contact with sebum in certain applications.

For example, one of the brakes on the use of TPE for skin-contact articles, particularly in the electronics market, is their poor sebum resistance. The cause is the flexible blocks, especially polyether blocks, for example PTMG, which are lipophilic in nature. The grades most affected are flexible ones with block copolymers comprising primarily flexible blocks, since these copolymers oftentimes have very high polyether content.

It is therefore an aim of the present invention to provide thermoplastic polymer elastomer compositions (abbreviated "TPE") which exhibit improved sebum resistance.

SUMMARY OF THE INVENTION

The applicant has now found that the use of polycaprolactone as flexible block affords a whole range of TPEs that are particularly resistant to sebum, including the most flexible grades with a shore D hardness of less than 50 shD, preferably a shore D hardness of less than 40 shore D.

The TPEs obtained in the invention unexpectedly and additionally have very good tensile mechanical properties—Young's moduli and deformation (elongation) at break (according to standard ISO 527-2: 2012-1A)—comparable with those of TPEs based on flexible polyether blocks, with the only difference that these mechanical properties, in the case of the TPEs according to the invention, are retained even after prolonged and/or repeated contact with sebum.

In fact, beyond a certain level of PCL used in the flexible blocks, an improvement is observed in the deformation (elongation) at break (measured according to standard ISO 527-2: 2012-1A) of these TPEs in contact with sebum.

DETAILED DESCRIPTION OF THE INVENTION

The present invention therefore provides for the use of polycaprolactone (abbreviated PCL) in preparing a block copolymer with rigid blocks and flexible blocks for enhancing the sebum resistance of said block copolymer.

Polycaprolactone is a synthetic aliphatic polyester which is hydrophobic and biodegradable. This semicrystalline polymer is nontoxic.

Polycaprolactone (PCL) refers more particularly to polycaprolactones with a functionality of 2, 3 or 4, preferably polyols, and with a number-average molar mass Mn within the range from 400 to 10 000 g/mol.

The polycaprolactones in the sense of the invention are advantageously polycaprolactone polyols produced by addition polymerization by ring opening of epsilon-caprolactone with hydroxyl groups of an initiator.

Caprolactone, more particularly epsilon-caprolactone, is a lactone which is available commercially. The reaction is performed at a temperature within the range from 100 to 230° C., preferably in the presence of a catalyst. Patent documents U.S. Pat. Nos. 3,021,309 and 3,021,317 describe cyclic ester polymerization reactions of these kinds. Epsilon-caprolactone may be replaced by 6-hydroxycaproic acid.

The polyols that can be used as initiators may be represented by the general formula: R—(OH)x in which R represents an aromatic hydrocarbon group having 1 or 2 aromatic rings, an alicyclic hydrocarbon group having 4 to 37 carbon atoms, a saturated or unsaturated aliphatic group having 1 to 30 carbon atoms, a polyester polyol residue having an average molecular weight of 200 to 6000 g/mol or a polyalkylene glycol residue having an average molecular weight of 200 to 6000 g/mol and x represents an integer from 2 to 4.

Examples of initiators include resorcinol, pyrocatechol, hydroquinone, pyrogallol, phloroglucinol, bisphenol A, bisphenol F and addition products thereof with ethylene, dimethylolbenzene, cyclohexanedimethanol, ethylene glycol, diethylene glycol, triethylene glycol, propylene glycol, dipropylene glycol, 1,4-butanediol, 1,3-butanediol, 2-methyl-1,3-propylene glycol, neopentyl glycol, 1,5-pentanediol, 1,6-hexanediol, glycerol, trimethylolpropane or pentaerythritol; polyester polyols having an average molecular weight of 200 to 6000 g/mol and formed from a dicarboxylic acid such as terephthalic, isophthalic, adipic, sebacic, undecanedioic or dodecanedioic acid or a fatty acid dimer, and a diol such as ethylene glycol, diethylene glycol, triethylene glycol, propylene glycol, 1,4-butanediol, neopentyl glycol, 1,5-pentanediol or 1,6-hexanediol; polyethylene glycol, propylene glycol and polytetramethylene glycol having an average molecular weight of 200 to 6000 g/mol;

random or block copolymers of ethylene oxide and propylene oxide; and random or block copolymers of ethylene oxide and tetrahydrofuran.

Polycaprolactone polyols comprise preferably at least two terminal hydroxyl groups.

Preferred initiator polyols are in particular those selected from: neopentyl glycol, butanediol, diethylene glycol, ethylene glycol, hexanediol, polytetramethylene glycol, fatty acid dimer diol or else polyester comprising at least one fatty acid dimer diol.

PCL polyols particularly suitable for use in the present invention may also be selected from the CAPA series from Ingevity or Priplast XL series from Croda. Priplast XLs are described in particular in patent document US2016/0229946.

The PCL preferably represents at least 10%, preferably at least 15%, preferably at least 20%, preferably at least 25%, preferably at least 30%, preferably at least 35%, preferably at least 40%, preferably at least 45%, preferably at least 50%, preferably at least 55%, preferably at least 60%, preferably at least 65%, preferably at least 70%, preferably at least 75%, preferably at least 80%, preferably at least 85%, preferably at least 90%, preferably at least 95%, preferably at least 98%, preferably at least 99%, by weight of the flexible blocks, based on the total weight of flexible blocks, which represents 100%.

The PCL preferably represents 100% of said flexible blocks.

The PCL advantageously represents from 50 to 100%, preferably from 80 to 100%, by weight of the flexible blocks, based on the total weight of flexible blocks, which represents 100%. In these proportions, the use of PCL in a copolymer containing rigid blocks and flexible blocks according to the invention enhances the sebum resistance of said block copolymer without impairing its tensile mechanical properties.

According to another particularly advantageous embodiment of the present invention, the PCL is used in a copolymer containing rigid blocks and flexible blocks for enhancing both:
the sebum resistance of said block copolymer and
the elongation at break of said copolymer when in contact with sebum, the PCL representing from 50 to 100%, preferably from 80 to 100%, preferably from 90 to 100% by weight of the flexible blocks, based on the total weight of flexible blocks, which represents 100%.

The present invention also provides a sebum-resistant block copolymer, characterized in that it comprises rigid blocks and flexible blocks comprising at least 50% by weight of PCL, preferably from 50 to 100% by weight of PCL, preferably from 50 to 90%, preferably more than 50% by weight of PCL, preferably at least 55% by weight of PCL, preferably at least 60% by weight of PCL, preferably at least 65% by weight of PCL, preferably at least 70%, preferably at least 75%, preferably at least 80%, preferably from 80 to 90% by weight of PCL, based on the total weight of flexible blocks, which represents 100%.

Block copolymer according to the invention is understood to mean thermoplastic elastomer polymers (TPEs), which alternately comprise "hard" or "rigid" blocks or segments (with a rather thermoplastic behavior) and "flexible" or "supple" blocks or segments (with a rather elastomeric behavior). A block is said to be "flexible" if it has a low glass transition temperature (Tg). Low glass transition temperature is understood to mean a glass transition temperature Tg of less than 15° C., preferably of less than 0° C., advantageously of less than −15° C., more advantageously still of less than −30° C., optionally of less than −50° C.

Advantageously, said at least one block copolymer comprises at least one block selected from: polyether blocks, polyester blocks, polyamide blocks, polyurethane blocks, and mixtures thereof.

By soft or flexible blocks that may be contemplated in the copolymer according to the invention are meant in particular those comprising, further to the PCL, at least one of the following polymers: polyether; polyester; polysiloxane, such as polydimethylsiloxane or PDMS; polyolefin; polycarbonate; and mixtures thereof. The flexible blocks are described for example in French patent document FR2941700 at page 32 line 3 to page 38 line 23. The present invention prefers polyether when the flexible blocks comprise at least one other polymer further to PCL. By way of example, the polyether is selected from: poly(ethylene glycol) (PEG), poly(1,2-propylene glycol) (PPG), poly(1,3-propylene glycol) (PO3G), poly(tetramethylene glycol) (PTMG), and copolymers or mixtures thereof.

The rigid blocks in the copolymer according to the invention may be based on polyamide, on polyurethane, on polyester or on a mixture of these polymers. These blocks are described in particular in French patent application FR2936803. The rigid blocks are preferably polyamide-based.

Mention may be made, as examples of copolymers having rigid blocks and flexible blocks, respectively of (a) copolymers having polyester blocks and polyether blocks (also known as COPEs or copolyetheresters), (b) copolymers having polyurethane blocks and polyether blocks (also known as TPUs, the abbreviation for thermoplastic polyurethanes) and (c) copolymers having polyamide blocks and polyether blocks (also known as PEBAs according to the IUPAC, or else polyether-block-amide).

Preferably, said at least one block copolymer (A) comprises a copolymer having polyamide blocks and polyether blocks (PEBAs).

The polyamide (abbreviated PA) blocks may comprise homopolyamides or copolyamides.

The polyamide blocks which can be envisaged in the composition of the invention are in particular those defined in application FR 0 950 637 from page 27, line 18, to page 31, line 14. The standard NF EN ISO 1874-1: 2011 defines a nomenclature for polyamides.

The term "monomer" in the present description of the polyamides should be taken as meaning "repeating unit". Note that the case where a repeat unit of the polyamide consists of the combination of a diacid with a diamine is particular. It is the combination of a diamine and of a diacid, that is to say the "diamine-diacid" or "XY" pair, in equimolar amounts that is considered to correspond to the monomer. The rationale for this is that the individual diacid or diamine is just a structural unit that is itself unable to polymerize on its own.

In the block copolymers according to the invention, the PA blocks preferably have carboxylic acid ends, being then referred to as diacid PA. The linkages between the hard blocks HB (here, PA) and the soft blocks (SB) are therefore generally ester linkages. The polyamide blocks comprising dicarboxyl chain ends originate, for example, from the condensation of polyamide precursors in the presence of a chain-limiting dicarboxylic acid.

Three types of polyamide may be employed in the composition of these PA blocks.

According to a first type, the polyamide blocks originate from the condensation of at least one (aliphatic, cycloaliphatic or aromatic) dicarboxylic acid, more particularly those having from 4 to 36 carbon atoms, preferably those having from 6 to 18 carbon atoms, and of at least one (aliphatic, cycloaliphatic or aromatic) diamine selected more particularly from those having from 2 to 36 carbon atoms, preferably those having from 6 to 12 carbon atoms.

Examples of aliphatic diacids are butanedioic, adipic, suberic, azelaic, sebacic, dodecanedicarboxylic, myristic, tetradecanedicarboxylic, hexadecanedicarboxylic, octadecanedicarboxylic and dimerized fatty acids.

An example of a cycloaliphatic diacid is 1,4-cyclohexanedicarboxylic acid.

Examples of aromatic diacids are terephthalic acid (T), isophthalic acid (I), and the sodium, potassium or lithium salt of 5-sulfoisophthalic acid.

Examples of aliphatic diamines are tetramethylenediamine, hexamethylenediamine, decamethylene-1,10-diamine, dodecamethylenediamine and trimethylhexamethylenediamine.

Examples of cycloaliphatic diamines are the isomers of bis(4-aminocyclohexyl)methane (BACM or PACM), bis(3-methyl-4-aminocyclohexyl)methane (BMACM or MACM), and 2,2-bis(3-methyl-4-aminocyclohexyl)propane (BMACP), isophoronediamine (IPDA), 2,6-bis(aminomethyl)norbornane (BAMN), and piperazine (Pip).

Advantageously the copolymer according to the invention comprises at least one PA block based on PA 44, PA 46, PA 49, PA 410, PA 412, PA 413, PA 414, PA 416, PA 418, PA 436, PA 64, PA 66, PA 69, PA 610, PA 612, PA 613, PA 614, PA 616, PA 618, PA 636, PA 94, PA 96, PA 910, PA 912, PA 913, PA 914, PA 916, PA 918, PA 936, PA 104, PA 106, PA 109, PA 1010, PA 1012, PA 1013, PA 1014, PA 1016, PA 1018, PA 1036, PA 10T, PA 101, PA BMACM4, PA BMACM6, PA BMACM9, PA BMACM10, PA BMACM12, PA BMACM13, PA BMACM14, PA BMACM16, PA BMACM18, PA BMACM36, PA PACM4, PA PACM6, PA PACM9, PA PACM10, PA PACM12, PA PACM13, PA PACM14, PA PACM16, PA PACM18, PA PACM36, PA Pip4, PA Pip6, PA Pip9, PA Pip10, PA Pip12, PA Pip13, PA Pip14, PA Pip16, PA Pip18 and/or PA Pip36, and copolymers thereof.

According to a second type, the polyamide blocks result from the condensation of one or more alpha,omega-aminocarboxylic acids and/or of one or more lactams having from 6 to 12 carbon atoms in the presence of a dicarboxylic acid having from 4 to 36 carbon atoms.

Examples of lactams include caprolactam, enantholactam and laurolactam.

Examples of alpha,omega-aminocarboxylic acids are aminocaproic acid, 7-aminoheptanoic acid, 11-aminoundecanoic acid and 12-aminododecanoic acid.

Advantageously, the polyamide blocks of the second type are made of polyamide 11, polyamide 12 or polyamide 6.

According to a third type, the polyamide blocks result from the condensation of at least one monomer of the first type with at least one monomer of the second type. In other words, the polyamide blocks result from the condensation of at least one alpha,omega-aminocarboxylic acid (or a lactam) with at least one diamine and a dicarboxylic acid.

In this case, the PA blocks are prepared by polycondensation:
of the one or more aliphatic, cycloaliphatic or aromatic diamines having X carbon atoms;
of the one or more dicarboxylic acids having Y carbon atoms; and
of the one or more comonomers {Z}, selected from lactams and alpha,omega-aminocarboxylic acids having Z carbon atoms;
in the presence of a chain limiter selected from dicarboxylic acids or of an excess of diacid used as structural unit.

It is advantageous to use as chain limiter the dicarboxylic acid having Y carbon atoms, which is introduced in excess with respect to the stoichiometry of the diamine(s).

According to one variant of copolyamides, the polyamide blocks result from the condensation of at least two different alpha,omega-aminocarboxylic acids or of at least two different lactams having from 6 to 12 carbon atoms or of one lactam and one aminocarboxylic acid not having the same number of carbon atoms, in the optional presence of a chain limiter.

Examples of polyamide blocks include those formed by the following polyamides (copolyamides):

PA 6/12, in which 6 denotes caprolactam and 12 denotes laurolactam.

PA 11/12, in which 11 denotes 11-aminoundecanoic acid and 12 denotes laurolactam.

PA 6/11, in which 6 denotes caprolactam and 11 denotes 11-aminoundecanoic acid.

PA 6/6.6, in which 6 denotes caprolactam and 6.6 denotes a monomer resulting from the condensation of hexamethylenediamine with adipic acid.

Further examples include PA 1010/11, PA 610/11, PA1012/11, PA 1010/11/12, PA 610/1010/11, PA 610/612/11, PA 610/612/1010, PA 11/636, PA 11/1036 and PA 1010/1036.

Examples of polyamide blocks preferred in the invention include those comprising at least one of the following molecules: PA12, PA11, PA1010, PA610, PA6, PA6/12 and/or those comprising at least one of the following monomers: 6, 11, 12, 11, 54, 59, 510, 512, 513, 514, 516, 518, 536, 64, 69, 610, 612, 613, 614, 616, 618, 636, 104, 109, 1010, 1012, 1013, 1014, 1016, 1018, 1036, 10T, 124, 129, 1210, 1212, 1213, 1214, 1216, 1218, 1236, 12T and mixtures or copolyamides thereof.

The number-average molar mass Mn of the polyamide blocks is preferably within the range extending from 400 to 20 000 g/mol, preferably from 500 to 10 000 g/mol and more preferably from 600 to 5000 g/mol.

By flexible or soft blocks which may be contemplated in the TPEs according to the invention are meant in particular those selected from polyether blocks, polyester blocks, polysiloxane blocks, such as polydimethylsiloxane or PDMS blocks, polyolefin blocks, polycarbonate blocks and mixtures thereof. The flexible blocks preferably comprise polyether blocks.

Polyether (hereinafter abbreviated to PE) blocks in the sense of the invention are understood as meaning polyoxyalkylenes, such as polyalkylene ether polyols, particularly polyalkylene ether diols. The PE blocks of the copolymer of the invention comprise at least one molecule chosen from poly(ethylene glycol) (PEG), poly(1,2-propylene glycol) (PPG), polytetramethylene glycol (PTMG), polyhexamethylene glycol, poly(1,3-propylene glycol) (PO3G), poly(3-alkyltetrahydrofuran), in particular poly(3-methyltetrahydrofuran (poly(3MeTHF)), and mixtures thereof. It is also possible to contemplate a PE block of alternating, random or block "copolyether" type, containing a chain of at least two types of PE stated above.

The polyether blocks may also comprise blocks obtained by ethoxylation of bisphenols, for example bisphenol A. These latter products are described in patent EP613919.

The polyether blocks can also comprise ethoxylated primary amines. Examples of ethoxylated primary amines include the products of formula:

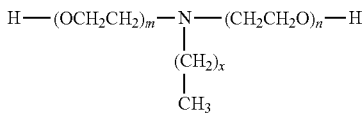

in which m and n are between 1 and 20 and x is between 8 and 18. These products are commercially available under the Noramox® brand from CECA and under the Genamin® brand from Clariant.

The block SB preferably comprises PTMG, in addition to PCL.

Polyester (hereinafter abbreviated to PES) blocks in the sense of the invention are understood as meaning polyesters normally produced by polycondensation between a dicarboxylic acid and a diol. Suitable carboxylic acids include those mentioned above used to form the polyamide blocks with the exception of aromatic acids, such as terephthalic and isophthalic acid. Suitable diols include linear aliphatic diols such as ethylene glycol, 1,3-propylene glycol, 1,4-butylene glycol, 1,6-hexylene glycol, branched diols such as neopentyl glycol, 3-methylpentane glycol, 1,2-propylene glycol, and cyclic diols such as 1,4-bis(hydroxymethyl) cyclohexane, and 1,4-cyclohexanedimethanol.

The term "polyesters" also means PESs based on fatty acid dimers, more particularly the products of the Priplast® range from Croda, or of the Nouracid® range from Oléon.

It is also possible to envisage a PES block of alternating, statistical or block "copolyester" type, containing a chain of at least two types of PES mentioned above.

For the purposes of the invention, a polysiloxane (abbreviated hereinafter to PSi) block is understood as meaning any organosilicon polymer or oligomer of linear or cyclic, branched or crosslinked structure, obtained by polymerization of functionalized silanes, and consisting essentially of a repetition of main units in which silicon atoms are linked together via oxygen atoms (siloxane linkage —Si—O—Si—), optionally substituted hydrocarbon radicals being directly attached via a carbon atom to said silicon atoms. The most common hydrocarbon radicals are alkyl radicals, in particular C1-C10 radicals and especially methyl, fluoroalkyl radicals, aryl radicals and especially phenyl, and alkenyl radicals and especially vinyl; other types of radicals that may be attached to the siloxane chain, either directly or via a hydrocarbon radical, are in particular hydrogen, halogens and especially chlorine, bromine or fluorine, thiols, alkoxy radicals, polyoxyalkylene (or polyether) radicals and especially polyoxyethylene and/or polyoxypropylene, hydroxyl or hydroxyalkyl radicals, substituted or unsubstituted amine groups, amide groups, acyloxy or acyloxyalkyl radicals, hydroxyalkylamino or aminoalkyl radicals, quaternary ammonium groups, amphoteric or betaine groups, anionic groups such as carboxylates, thioglycolates, sulfosuccinates, thiosulfates, phosphates and sulfates, and mixtures thereof, this list of course not being in any way exhaustive ("organomodified" silicones).

Preferably, said polysiloxane blocks comprise polydimethylsiloxane (abbreviated hereinbelow as PDMS blocks), polymethylphenylsiloxane and/or polyvinylsiloxane.

For the purposes of the invention, the term polyolefin (abbreviated hereinbelow as PO) block means any polymer comprising an alpha-olefin as monomer, i.e., homopolymers of an olefin or copolymers of at least one alpha-olefin and of at least one other copolymerizable monomer, the alpha-olefin advantageously having from 2 to 30 carbon atoms.

Examples of alpha-olefins are ethylene, propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene, 1-eicosene, 1-docosene, 1-tetracosene, 1-hexacosene, 1-octacosene and 1-triacontene. These α-olefins may be used alone or as a mixture of two or more than two.

Examples include:
ethylene homopolymers and copolymers, in particular low-density polyethylene (LDPE), high-density polyethylene (HDPE), linear low-density polyethylene (LLDPE), very-low-density polyethylene (VLDPE) and polyethylene obtained by metallocene catalysis,
propylene homopolymers and copolymers,
essentially amorphous or atactic poly-α-olefins (APAO), ethylene/α-olefin copolymers such as ethylene/propylene, EPR (ethylene-propylene-rubber) elastomers and EPDM (ethylene-propylene-diene) elastomers, and mixtures of polyethylene with an EPR or an EPDM,
styrene/ethylene-butene/styrene (SEBS), styrene/butadiene/styrene (SBS), styrene/isoprene/styrene (SIS) and styrene/ethylene-propylene/styrene (SEPS) block copolymers;
copolymers of ethylene with at least one product chosen from salts or esters of unsaturated carboxylic acids, for instance alkyl (meth)acrylates, the alkyl possibly containing up to 24 carbon atoms, vinyl esters of saturated carboxylic acids, for instance vinyl acetate or propionate, and dienes, for instance 1,4-hexadiene or polybutadiene.

According to an advantageous embodiment of the invention, said at least one polyolefin block comprises polyisobutylene and/or polybutadiene.

According to one particularly advantageous embodiment, the block copolymer according to the invention includes at least one flexible polyolefin block (PO block) and at least one hydrophilic hard block (abbreviated hereinbelow as hHB) comprising both polyamide and polyether, such as a polyetheramide block, a polyetheresteramide block and/or a polyetheramideimide block, etc. Said PO block preferably comprises a polyolefin including acid, alcohol or amine end groups. Preferably, the PO block is obtained by thermal degradation of high molecular weight polyolefins to form polyolefins of lower mass and functionalized (reference method: Japanese Kokai Publication Hei-03-62804). As regards the hHB block, it may also comprise at least one polymer chosen from: cationic polymers of quaternary amine type and/or phosphorus derivatives; and/or anionic polymers, of modified diacid type, including a sulfonate group and which are capable of reacting with a polyol. The addition of organic salt may then be envisaged in the preparation of the hHB block or during the reaction between the PO block and the hHB block. U.S. Pat. No. 6,552,131 describes the synthesis and the various possible structures for the copolymer containing PO blocks and hHB blocks, it being possible, of course, for the latter to be envisaged in the process according to the invention.

For the purposes of the invention, the term polycarbonate block (abbreviated hereinafter to PC block) more particularly means any aliphatic polycarbonate. Aliphatic polycarbonates are described, for example, in DE2546534 and JP1009225. Such homopolymeric or copolymeric polycarbonates are also described in document US471203. Patent applications WO 92/22600 and WO 95/12629 describe copolymers comprising polycarbonate blocks and also the processes for synthesizing same. The blocks (and the synthesis thereof) described in these documents may entirely be contemplated for the synthesis of a PC block copolymer according to the invention. Preferably, the polycarbonate blocks of the copolymers according to the invention have the formula:

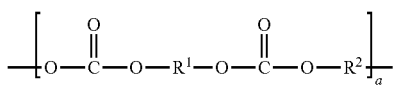

in which a is an integer from 2 to 300; R1 and R2, which may be identical or different, represent a straight or branched, aliphatic or alicyclic chain containing from 2 to 18 carbon atoms, or represent a polyoxyalkylene group, or represent a polyester group.

The polycarbonates in which R1 and R2 are selected from hexylene, decylene, dodecylene, 1,4-cyclohexylene, 2,2-dimethyl-1,3-propylene, 2,5-dimethyl-2,5-hexylene or polyoxyethylene groups are preferred.

If the block copolymers described above generally comprise at least one rigid polyamide block and at least one flexible block, it is obvious that the present invention in fact covers all the copolymers comprising two, three, four (or even more) different blocks selected from those described in the present description, provided that at least one flexible block comprising PCL and at least one rigid block are present. In the copolymer according to the invention, advantageously, the flexible blocks (FB) comprise, further to PCL, at least one of the following polymers in a minority proportion by weight (less than 50% by weight), based on the total weight of the flexible block: polyether; polyester; polysiloxane, such as polydimethylsiloxane; polyolefin; polycarbonate; and mixtures thereof.

The flexible blocks preferably comprise polyether.

As a result of these proportions in the flexible block, the copolymers according to the invention are resistant to sebum and also exhibit very good tensile mechanical properties (Young's moduli and deformation at break), which are retained even after prolonged/repeated contact with sebum.

Advantageously, the copolymer according to the invention comprises a segmented block copolymer comprising three different types of blocks (referred to as "triblock" in the present description of the invention), which results from the condensation of at least one PCL block, at least one (other) flexible block and at least one rigid block, as defined above.

Both the rigid blocks and the soft blocks may advantageously derive from renewable materials and/or from materials of fossil origin. Said rigid blocks and/or the soft blocks advantageously derive at least partly from renewable materials. According to one particularly advantageous embodiment of the present invention, the polyamide blocks and/or the polyether blocks and/or the polyester blocks and/or the polysiloxane blocks and/or the polyolefin blocks and/or the polycarbonate blocks derive entirely from renewable materials.

A material of renewable origin, also called biomaterial, is an organic material in which the carbon comes from $CO_2$ fixed recently (on a human timescale) by photosynthesis from the atmosphere. On land, this $CO_2$ is captured or fixed by plants. In the ocean, the $CO_2$ is captured or fixed by bacteria or plankton, leading to photosynthesis. A biomaterial (100% natural-origin carbon) has a $^{14}C/^{12}C$ isotope ratio of more than $10^{-12}$, typically of the order of $1.2\times10^{-12}$, whereas a fossil material has a zero ratio. This is because the $^{14}C$ isotope forms in the atmosphere and then is integrated by photosynthesis, on a timescale of no more than a few decades. The half-life of $^{14}C$ is 5730 years. Materials deriving from photosynthesis, namely plants, in general, thus necessarily have a maximum content of isotope $^{14}C$.

The biomaterial content or biocarbon content is determined by application of the standards ASTM D 6866 (ASTM D 6866-06) and ASTM D 7026 (ASTM D 7026-04). Standard ASTM D 6866 is directed to "Determining the Biobased Content of Natural Range Materials Using Radiocarbon and Isotope Ratio Mass Spectrometry Analysis", whereas standard ASTM D 7026 is directed to the "Sampling and Reporting of Results for Determination of Biobased Content of Materials via Carbon Isotope Analysis". The second standard references the first in its first paragraph.

The first standard describes a test for measuring the $^{14}C/^{12}C$ ratio of a sample and comparing it with the $^{14}C/^{12}C$ ratio of a reference sample of 100% renewable origin, to give a relative percentage of C of renewable origin in the sample. The standard is based on the same concepts as $^{14}C$ dating, but without applying the dating equations.

The ratio thus calculated is termed the "pMC" (percent Modern Carbon). If the material under analysis is a mixture of biomaterial and fossil material (with no radioactive isotope), then the pMC value obtained is directly correlated to the amount of biomaterial present in the sample. The reference value used for $^{14}C$ dating is a value dating from the 1950s. This year was chosen in view of the existence of nuclear tests in the atmosphere that introduced large amounts of isotopes into the atmosphere after this date. The 1950 reference corresponds to a pMC value of 100. Because of the thermonuclear tests, the current value to be retained is around 107.5 (corresponding to a correction value of 0.93). The radioactive carbon signature of a present-day plant is thus 107.5. Signatures of 54 pMC and of 99 pMC thus correspond to an amount of biomaterial in the sample of 50% and of 93%, respectively.

The ASTM D 6866 standard proposes three techniques for measuring the $^{14}C$ isotope content:

LSC (Liquid Scintillation Counting) spectrometry. This technique involves counting the "beta" particles resulting from the disintegration of $^{14}C$. The beta radiation from a sample of known mass (known number of C atoms) is measured for a certain time. This "radioactivity" is proportional to the number of atoms of $^{14}C$, which can thus be determined. The $^{14}C$ present in the sample emits ß-radiation, which on contact with the liquid scintillant (scintillator) gives rise to photons. These photons have different energies (of between 0 and 156 keV) and form what is called a $^{14}C$ spectrum. According to two variants of this method, the analysis relates either to the $CO_2$ produced beforehand by the carbon-containing sample in a suitable absorbent solution, or to benzene after prior conversion of the carbon-containing sample to benzene. The ASTM D 6866 standard thus gives two methods, A and C, based on this LSC method.

AMS/IRMS (Accelerated Mass Spectrometry coupled with Isotope Radio Mass Spectrometry). This technique is based on mass spectrometry. The sample is reduced to graphite or to C02 gas and analyzed in a mass spectrometer. This technique employs an accelerator and a mass spectrometer to separate the $^{14}C$ from the $^{12}C$ ions and so as to determine the ratio of the two isotopes.

The copolymers according to the invention originate at least partly from biomaterial and thus have a biomaterial content of at least 1%, corresponding to a $^{14}C$ content of at least $1.2 \times 10^{-14}$.

The present invention also provides a process for synthesizing a block copolymer according to the invention, comprising the polycondensation of at least one rigid block, particularly polyamide, with at least one flexible block composed primarily of PCL, i.e., containing more than 50% by weight of PCL, based on the total weight of flexible block(s).

A thermoplastic elastomer for the purposes of the invention is a block copolymer comprising an alternating sequence of hard blocks (HB) and soft blocks (SB), according to the following general formula:

$$-[HB-SB]_n-$$

and in which:
  HB or Hard Block represents a block comprising polyamide (homopolyamide or copolyamide) or polyurethane or polyester, or a mixture of these blocks, preferably polyamide, abbreviated independently hereinbelow as HB block;
  SB or Soft Block represents a block based on polycaprolactone (PCL) and other polymers, selected from polyether (PE block), polyester (PES block), polydimethylsiloxane (PDMS block), polyolefin (PO block), polycarbonate (PC block) and/or any other polymer with a low glass transition temperature, or mixtures thereof in the form of alternating, random or block copolymers. Preferably, SB is a block totally or partly based on polyether including ethylene oxide units.
  n represents the number of repeating units in the unit -HB-SB- of said copolymer. n is within the range extending from 1 to 60, preferably from 5 to 30 or better still from 6 to 20.

The process for synthesizing a block copolymer according to the invention employs any means for attaching said hard blocks HB to said soft blocks SB, more particularly PCL. A number of means may be considered: in solution, in the solid state or via an interfacial technique, or even by combining a plurality of these methods, as described in chapter 9 of the Handbook of Condensation Thermoplastic Elastomers (edited by Stoyko Fakirox, Wiley-VCH, Weinheim, 2005).

The TPEs based on hard blocks and flexible blocks according to the invention result from the bulk polycondensation of hard blocks (HB) having reactive ends with soft blocks (SB) having complementary reactive ends, such as HB having isocyanate or carboxylic acid chain ends with SB having an alcohol chain end.

For example, PEBA-PCLs, copolymers with PA, PE and PCL blocks, which are PEBAs having improved sebum resistance according to the invention, result from the polycondensation of polyamide blocks HB having carboxylic acid chain ends with polyether blocks SB having alcohol chain ends and PCL blocks.

In industry, the process of attaching the HBs to the SBs is carried out either in two main steps or in a single main step.

Whether in one or two steps, it is advantageous to operate in the presence of a catalyst. A catalyst is any product facilitating the linkage of the polyamide blocks and the soft blocks, especially by esterification. The esterification catalyst is advantageously a derivative of a metal selected from the group formed by titanium, zirconium, and hafnium or else a strong acid such as phosphoric acid or boric acid. The catalysts described in the following patents may be used: U.S. Pat. Nos. 4,331,786, 4,115,475, 4,195,015, 4,839,441, 4,864,014, 4,230,838 et U.S. Pat. No. 4,332,920, WO 04 037898, EP 1262527, EP 1270211, EP 1136512, EP 1046675, EP 1057870, EP 1155065, EP 506495, and EP 504058.

In a first embodiment, the process of the invention comprises two main steps. In a first step (I), at least one hard block HB is prepared (for example, PA), and in a second step (II), said at least one hard block HB (for example, PA) is reacted with at least one block SB, preferably in the presence of a catalyst and under reduced pressure.

Said step (I) may comprise any means known to the skilled person for producing polyamide blocks, for example by a polycondensation reaction between polyamide precursors and a dicarboxylic acid or a diamine as chain regulator. In this case, step I is divided into several substeps:
  (I-1) charging a reactor (for example an autoclave) with a mixture comprising at least one PA precursor and at least one chain regulator, such as a diacid.
  Said chain regulator is preferably selected from adipic acid, sebacic acid, terephthalic acid, isophthalic acid, and mixtures thereof;
  (I-2) phase of heating said mixture to a temperature within a range from 180 to 350° C., preferably from 200 to 300° C., preferably from 230 to 290° C.; Water may optionally be added to the mixture to improve thermal conduction and/or to reach a sufficient pressure, in particular for ring-opening of lactam 12, for example.
  (I-3) hot isothermal phase, during which the temperature of the mixture is kept constant, this being within a range from 180 to 350° C., preferably from 200 to 300° C., preferably from 230 to 290° C., for a time sufficient to bring all the materials introduced in I-1 to a fluid state, that is to say a state of sufficiently low viscosity for there to be a homogeneous mixture; The duration of the hot isothermal phase is generally within a range from 15 minutes to 5 hours, preferably from 30 minutes to 4 hours, preferably from 30 minutes to 3 hours.

During this hot isothermal phase, a pressure of, for example, between 1 and 40 bar develops in the reactor. The pressure preferably does not exceed 30 bar, but this maximum pressure does depend on the reactor and on the way in which it is constructed.
  (I-4) phase of removing water, by expansion (reduction in pressure) of said mixture, during which the mixture returns to atmospheric pressure, and/or by distillation. This is water optionally added during phase I-1, I-2 and/or 1-3 or water formed during these phases; then
  (I-5) purging with inert gas until complete polymerization of the mixture in the form of polyamide blocks.

The purge time may be within a range from a few minutes to a few hours, preferably from 5 minutes to 5 hours, preferably from 30 minutes to 3 hours, preferably from 1 hour to 2 hours.

Step I may further comprise one or more of the following substeps:
  (I-6) optional step of maintaining under reduced pressure, for example less than 500 mbar, preferably less than 100 mbar, to increase the yield of the polymerization if necessary.
  (I-7) optional step of recovering the hard blocks HB, for example PA blocks.

All the starting materials necessary for the formation of the HB block may be loaded into the reactor at the start in the order that the skilled person deems appropriate, as is the case for example during step I-1 of the process described above by way of example, but it is of course possible to consider introducing one or more starting materials during any of substeps I-1 to I-7.

The temperature for this main step I is within a range from 180 to 350° C., preferably from 200 to 300° C., or better still from 230 to 290° C.

Said at least one hard block HB (for example, PA block) may be extruded for subsequent use, stored in the reactor or transferred to another reactor, for the performance of step II described below.

Step (II) comprises the following substep(s):
(II-1) contacting, in a reactor, of at least part of the amount of at least one soft block SB with the HB blocks formed in step I, and adjusting the temperature of the resulting mixture if necessary, so that the temperature thereof is within a range from 180 to 350° C., preferably from 200 to 300° C., preferably from 200 to 260° C.;
(II-2) optional step of purging with nitrogen (or with another inert gas) and/or under slightly reduced pressure, for example less than 500 mbar, preferably less than 100 mbar, so as to remove the water that forms in the reactor during the copolymerization;
(II-3) optional step of introducing the remaining part of said at least one block SB as appropriate.

The temperature and duration of each step can be easily adjusted by those skilled in the art so as to optimize polycondensation reactivity while minimizing side reactions. The temperature for this main step II is likewise within a range from 180 to 350° C., preferably from 200 to 300° C., or better still from 200 to 260° C.

In a second embodiment, the process of the invention comprises a single main step characterized in that said at least one soft block is introduced directly during main step I, in the same way as the starting materials needed for formation of the hard block (for example, the PA block), that is to say during any of intermediate steps I-1 to I-7. In this embodiment, the main steps I and II are in fact carried out simultaneously, hence saving time, whereas, in the embodiment in two main steps, steps I and II are carried out successively.

However, the process of the invention is preferably the two-step process according to the first embodiment, as the one-step process carries the risk of causing numerous side reactions, such as transesterification and/or transesterification/amidation.

Irrespective of the embodiment thereof (in one step or in two steps), the process of the invention comprises a final step III of finalizing and recovering a block copolymer. This step III comprises at least two substeps:
(III-1) adjusting the viscosity of the copolymer obtained: the pressure in the reactor is reduced under high vacuum until the desired viscosity, that is to say the desired molar mass for the copolymer, is achieved. "Desired molar mass" is understood as meaning a number-average molar mass within a range from 10 000 to 100 000 g/mol, preferably within a range from 15 000 to 50 000 g/mol, preferably within a range from 20 000 g/mol to 40 000 g/mol.

The pressure during this substep is preferably less than 100 mbar, preferably less than 50 mbar, preferably less than 10 mbar, more preferably less than 1 mbar.

The increase in the molar mass of the copolymer, and therefore in the viscosity of the medium, is for example determined by measuring the change in the value of the torque exerted by the molten polymer on the stirrer or else by measuring the electrical power consumed by the stirrer for a given stirring speed.
(III-2) extruding and recovering said block copolymer, for example in the form of pellets or in any other form.
(III-3) optional step of baking the pellets to reduce the residual moisture content below 0.1% by weight.

The stirring speed in each step is optimized according to the rheology of the medium and the nature of the stirrer.

The reduction in pressure may be effected gradually or in a stepwise manner. The extent of the maximum reduction in pressure depends on the nature of the species present, the hydrophilicity or hydrophobicity thereof, and the reactivity thereof.

A catalyst may be added during one of steps I and/or II, preferably during one of substeps II, for a catalyst sensitive to hydrolysis.

The present invention further provides a sebum-resistant polymer composition, characterized in that it comprises at least one block copolymer according to the invention as defined above, diluted in a thermoplastic polymer matrix. Said polymer matrix advantageously comprises at least one homopolymeric or copolymeric thermoplastic polymer selected from: polyolefins, polyamides, fluoropolymers, saturated polyesters, polycarbonate, styrene resins, PMMA, thermoplastic polyurethanes (TPU), ethylene-vinyl acetate copolymers (EVA), copolymers having polyamide blocks and polyether blocks, copolymers having polyester blocks and polyether blocks, copolymers having polyamide blocks, polyether blocks, and polyester blocks, copolymers of ethylene and an alkyl (meth)acrylate, copolymers of ethylene and vinyl alcohol (EVOH), ABS, SAN, ASA, polyacetal, polyketones, and mixtures thereof. Said composition preferably comprises from 1 to 99%, preferably from 1 to 40%, by weight of said copolymer and from 1 to 99% by weight, preferably from 60 to 99% by weight, of said matrix polymer, based on the total weight of the composition, which represents 100%.

The copolymer according to the invention may be additized with stabilizers, plasticizers, lubricants, natural or organic fillers, dyes, pigments, nacres, antimicrobial agents, flame retardants, antistats, agents modifying the viscosity of the copolymer, and/or any other additive or adjuvant already cited and well known to the person skilled in the art of thermoplastic polymers.

The present invention further provides an article obtained by injection molding, overmolding, extrusion, coextrusion, hot compression molding or multi-shot injection molding from at least one copolymer according to the invention or from a composition according to the invention.

The present invention further provides an article obtained by 3D printing from a powder of copolymer according to the invention or from a powder of composition according to the invention.

The article obtained from the composition according to the invention advantageously has a tensile elasticity modulus of less than 500 MPa, preferably within the range from 10 to 200 MPa, preferably from 20 to 100 MPa, measured according to standard ISO 527-2: 2012-1A.

The present invention relates to any article liable to be in contact with the skin, or in repeated contact with it.

The present invention provides in particular:
a footwear article or article element, particularly sports footwear, footwear sole, particularly sports footwear sole, such as an insole, midsole or outsole, or a ski boot;
a sports article or article element, such as a racket, a ball or a float;

an article or article element of clothing, an accessory article or article element or an article or article element of personal protective equipment, such as a glove, helmet, life jacket or backpack;

an optical article or article element: components of spectacle frames, nose pads or nosepieces, protective elements on frames;

an automotive, railroad or aircraft article or article element: interior decorative element, rail sole, tire, wheel, handle, seat element, child car seat part;

a structural, padding or damping article or article element, particularly a part for damping impacts and/or vibrations, like those generated by a means of transport, carpet, sports mat, sports floor or ground covering, underlayment, membrane, handle, particularly door handle;

an article or article element for childcare or of a toy or of a part for a stroller, perambulator or baby-carrier;

a medical article or article element: patch, drug delivery system, sensor, splint, orthosis, neck brace, a dressing, particularly an antimicrobial foam dressing;

an electrical and/or electronic article or article element: headset, earphone, Bluetooth® jewelry or watch, display screen, connected watch, connected glasses, interactive game component or device, GPS, connected footwear, bioactivity monitor or sensor, interactive belt or bracelet, tracker, pocket scanner or palmtop, location sensors, vision assist device, audio equipment part, thermal and/or acoustic insulation part.

The copolymer according to the invention is of particular interest in the fields of mass-market electricals and electronics (hereinafter "E&E"), such as connected bracelets or shells or outer casings of IT, audio or mobile telephony equipment.

The present invention thus further provides an electrical or electronic article comprising a casing or protective casing manufactured from copolymer according to the invention as described above or from a composition according to the invention, said article preferably being a portable computer, a portable telephone or a tablet.

EXAMPLES

Sebum resistance tests were conducted on the following TPE samples:
Cp1: PA12/PTMG, with respective molar masses of 600/2000
Cp2: PA12/PTMG, 850/2000
Ex1: PA12/PCL, 600/2000
Ex2: PA12/PCL-PTMG-PCL, 600/2000, where the PCL-PTMG-PCL triblock comprises the respective molar masses 500-1000-500
Cp3: PA11/PTMG (850/2000)
Ex3: PA11/PCL-PTMG-PCL, 850/2000, laboratory sample
Ex4: PA11/PCL-PTMG-PCL, 850/2000, pilot-plant sample
Ex5: PA 1/Polyester based on PCL and fatty acid dimers, 850/2000, the polyester comprising 82% of PCL and 18% of fatty acid dimers (18% renewable C)
Ex6: PA11/Polyester based on PCL and fatty acid dimers, 850/3000, the polyester comprising 90% of PCL and 10% of fatty acid dimers
Ex7: PA11/PCL, 850/2000, laboratory sample
Ex8: PA11/PCL, 850/2000, pilot-plant sample
Ex9: PA11/PCL-PTMG-PCL, 850/3000, where the PCL-PTMG-PCL triblock comprises the respective molar masses 500-2000-500, laboratory sample The chain transfer agent used in all the tests is adipic acid.

Sebum Resistance Test

The sebum used is a synthetic sebum supplied by Interchim.

The samples in the case of table 1 below are 100×100×2 mm plaques. The 100×100×2 mm plaques are cut into 4, placed on a plate and covered with liquefied sebum at 60° C.

The samples in the case of table 2 below are dumbbells injection-molded on μ-DSM: the same amount of synthetic liquefied sebum at 60° C. (around 0.13 g) is applied to the useful zone of the test specimens.

In each case the same given mass of sebum is spread at the surface of the samples and then removed after conditioning. This operation is repeated on 3 plaques or dumbbells for each sample.

The sebum resistance is measured after conditioning in an oven at 23° C. and 50% RH for 7 days. The samples thus exposed are weighed after cleaning and the "mass acquisition" or weight increase (%) of the sample during the test is calculated. Any visual changes are also recorded.

In the case of table 2, dumbbells not exposed to the sebum were conditioned in an oven at 23° C. and 50% RH for 7 days. These controls enabled the negligible effect of the moisture acquisition of the copolymers on their weight increase (%) to be evaluated.

Table 1 below represents the different weight increases after 5 and 7 days' exposure.

TABLE 1

Weight increase results for samples (plaques) after sebum exposure

|  | Weight increase (%) | | | |
| --- | --- | --- | --- | --- |
|  | Cp1 | Cp2 | Ex1 | Ex2 |
| After 5 days | 13.9 | 13.1 | 3.9 | 11.1 |
| After 7 days | 16.9 | 14.0 | 4.7 | 12.3 |

For the block copolymers based on PA12 in table 1 above, it is noted that the largest mass acquisitions, 14-17%, are attained by the PEBAs based on flexible PTMG polyether block. Note that the more polyether-rich the PEBA (proportionally to the polyamide), the more it absorbs the sebum (weight increase of Cp1 greater than that of Cp2). Complete substitution of the flexible block by polycaprolactone (Ex1) significantly reduces the absorption of sebum (weight increase of 4.7% after 7 days' exposure). Partial substitution on the basis of a PCL-PTMG-PCL triblock (with respective molar masses 500-1000-500) in Ex2 also improves the sebum resistance of the PEBAs (weight increase of 12.3% after 7 days' exposure).

TABLE 2

Weight increase results for samples (dumbbells) after sebum exposure

|  | Cp3 | Ex3 | Ex4 | Ex5 | Ex6 | Ex7 | Ex8 | Ex9 |
|---|---|---|---|---|---|---|---|---|
| Proportion by weight of PCL based on total weight of the flexible blocks (%) | 0 | 50 | 50 | 82 | 90 | 100 | 100 | 33 |
| Weight increase after 7 days' exposure to sebum (%) | 5.3 | 3.5 | 3.3 | 2.6 | 2.1 | 1.8 | 1.7 | 5.3 |
| Control without sebum | 0.16 | 0.17 | <0.01 | <0.01 | <0.01 | 0.08 | <0.01 | 0.21 |

For the block copolymers based on PA11 in table 2 above, it is noted that the largest mass acquisition is for the grade based on PTMG (Cp3). All of the other samples containing PCL exhibit a sebum absorption of less than 5.3%. Complete substitution of the flexible block by PCL significantly reduces (divides by three) the mass acquisition of sebum (cases of Ex7 and Ex8, absorption reduced to 1.7-1.8%). On partial substitution, in the case of examples Ex3 and Ex4, which contain at least 50% of PCL relative to the total weight of flexible blocks, the sebum absorption is reduced to 3.3-3.5%. The flexible blocks of polyester based on PCL and fatty acid dimers (Ex5 and Ex6) enable a significant decrease in sebum absorption (divided by at least 2 relative to Cp3). The best results obtained with Ex6 (Ex6: mass acquisition 2.1% as against 2.6% for Ex5) can be explained by a higher PCL content (90% as against 82%), but also a higher molar mass ($M_n$=3000 g/mol for Ex6 as against 2000 g/mol for Ex5), the copolymer of Ex6 being richer in flexible blocks (78%) than that of Ex5 (70%).

Mechanical Properties

The mechanical properties of the block copolymer samples based on PA11 in table 2 above were characterized in tensile testing before and after exposure to sebum. Table 3 below collates the values for Young's modulus (MPa) and deformation (elongation) at break FR (%), measured according to standard ISO 527-2: 2012-1A. It is apparent from this that the more PCL-rich the copolymer, the more the mechanical properties of the material are retained after exposure to sebum. Conversely, in the case of copolymer Cp3 based on PTMG, the sebum absorption adversely affects the tensile strength: a decrease of 25% in the modulus and of almost 100% in the deformation at break are observed.

TABLE 3

Young's moduli and deformations at break before and after exposure to sebum

| Nature of the PE block | Modulus (MPa) | | | $\varepsilon_R$ (%) | | |
|---|---|---|---|---|---|---|
| | Without sebum | With sebum | Difference (%) | Without sebum | With sebum | Difference (%) |
| Cp3 | 21 | 16 | −24 | 569 | 479 | −16 |
| Ex3 | 36 | 33 | −8 | 813 | 919 | +13 |
| Ex5 | 30 | 29 | −3 | 616 | 624 | +1 |
| Ex7 | 39 | 39 | 0 | 924 | 982 | +6 |
| Ex8 | 36 | 36 | 0 | 989 | 1122 | +13 |
| Ex9 | 29 | 25 | −14 | 764 | 600 | −21 |

It is also observed in table 3 that the elongation at break FR (%) is increased for the block copolymers of the invention placed in contact with sebum (inventive Ex3, Ex5, Ex7, Ex8), in which the flexible blocks are based primarily on PCL.

This effect of improving the elongation at break of these TPE materials admixed with at least 50% of PCL when said materials are in contact with sebum is an entirely unexpected advantage observed for the copolymers of the present invention.

The invention claimed is:

1. A sebum-resistant block copolymer, wherein it comprises rigid blocks and flexible blocks comprising at least 50% by weight of PCL, based on the total weight of flexible blocks, which represents 100%, wherein the PCL is a polycaprolactone polyol,
wherein the flexible blocks (FB) comprise, further to PCL, at least one of the following polymers: polyether; polyester; polysiloxane; polyolefin; polycarbonate; and mixtures thereof.

2. The copolymer as claimed in claim 1, wherein the rigid blocks are based on PA and comprise at least one of the following polyamides: PA12, PA11, PA1010, PA6, PA6/12 and/or at least one of the following polyamide monomers: 11, 54, 59, 510, 512, 513, 514, 516, 518, 536, 64, 69, 610, 612, 613, 614, 616, 618, 636, 104, 109, 1010, 1012, 1013, 1014, 1016, 1018, 1036, 10T, 124, 129, 1210, 1212, 1213, 1214, 1216, 1218, 1236, 12T and mixtures or copolyamides thereof.

3. A process for synthesizing a block copolymer as claimed in claim 1, comprising the polycondensation of at least one rigid block, with at least one flexible block containing more than 50% by weight of PCL, based on the total weight of flexible block(s).

4. A sebum-resistant polymer composition, wherein it comprises at least one copolymer as claimed in claim 1 diluted in a thermoplastic polymer matrix.

5. The composition as claimed in claim 4, wherein said polymer matrix comprises at least one homopolymeric or copolymeric thermoplastic polymer selected from: polyolefins, polyamides, fluoropolymers, saturated polyesters, polycarbonate, styrene resins, PMMA, thermoplastic polyurethanes (TPU), ethylene-vinyl acetate copolymers (EVA), copolymers having polyamide blocks and polyether blocks, copolymers having polyester blocks and polyether blocks, copolymers having polyamide blocks, polyether blocks and polyester blocks, copolymers of ethylene and an alkyl (meth)acrylate, copolymers of ethylene and vinyl alcohol (EVOH), ABS, SAN, ASA, polyacetal, polyketones, and mixtures thereof.

6. The composition as claimed in claim 4, comprising from 1 to 99%, by weight, of said matrix polymer, based on the total weight of the composition, which represents 100%.

7. An article obtained by injection molding, overmolding, extrusion, coextrusion, hot compression molding or multi-shot injection molding from at least one copolymer as claimed in claim 1.

8. An article obtained by 3D printing from a powder of copolymer as claimed in claim 1.

9. The article as claimed in claim 7, the article being:
a footwear article or article element;
a sports article or article element;
an article or article element of clothing, an accessory article or article element or an article or article element of personal protective equipment;
an optical article or article element;
an automotive, railroad or aircraft article or article element;
a structural, padding or damping article or article element;
an article or article element for childcare or of a toy or of a part for a stroller, perambulator or baby-carrier;
a medical article or article element;
an electrical and/or electronic article or article element.

10. The article as claimed in claim 7, the article being an electrical or electronic article comprising a casing or protective casing manufactured from the copolymer.

11. The copolymer as claimed in claim 1, wherein flexible blocks comprise at least 80% by weight of PCL, based on the total weight of flexible blocks, which represents 100%.

12. The copolymer as claimed in claim 1, wherein flexible blocks comprise at least 90% by weight of PCL, based on the total weight of flexible blocks, which represents 100%.

13. The copolymer as claimed in claim 1, wherein flexible blocks comprise 50% to 90% by weight of PCL, based on the total weight of flexible blocks, which represents 100%.

14. The copolymer as claimed in claim 1, wherein flexible blocks comprise 50% to 80% by weight of PCL, based on the total weight of flexible blocks, which represents 100%.

15. The copolymer as claimed in claim 1, wherein flexible blocks comprise 80% to 90% by weight of PCL, based on the total weight of flexible blocks, which represents 100%.

\* \* \* \* \*